US009865071B2

(12) United States Patent
Bacus et al.

(10) Patent No.: US 9,865,071 B2
(45) Date of Patent: Jan. 9, 2018

(54) SIMULATING VARIANCES IN HUMAN WRITING WITH DIGITAL TYPOGRAPHY

(71) Applicant: AMAZON TECHNOLOGIES, INC., Seattle, WA (US)

(72) Inventors: Michael Patrick Bacus, Seattle, WA (US); Shawn C. Deyell, Lake Forest Park, WA (US); Hong Chen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 14/949,768

(22) Filed: Nov. 23, 2015

(65) Prior Publication Data
US 2016/0078660 A1    Mar. 17, 2016

Related U.S. Application Data

(63) Continuation of application No. 13/528,732, filed on Jun. 20, 2012, now Pat. No. 9,230,514.

(51) Int. Cl.
| | |
|---|---|
| *G06T 11/00* | (2006.01) |
| *G06T 11/60* | (2006.01) |
| *G09G 5/24* | (2006.01) |
| *G06F 17/21* | (2006.01) |
| *G06F 3/00* | (2006.01) |
| *G09G 5/28* | (2006.01) |

(52) U.S. Cl.
CPC ............. *G06T 11/60* (2013.01); *G06F 3/00* (2013.01); *G06F 17/214* (2013.01); *G09G 5/24* (2013.01); *G09G 5/28* (2013.01)

(58) Field of Classification Search
CPC ........ G06T 11/203; G09G 5/24; G09G 5/222; G06F 17/214; G06K 15/02
See application file for complete search history.

(56) References Cited

U.S. PATENT DOCUMENTS

| | | | | |
|---|---|---|---|---|
| 4,610,025 | A * | 9/1986 | Blum | G06K 7/143 380/1 |
| 5,108,206 | A * | 4/1992 | Yoshida | G06K 15/02 345/471 |
| 5,327,342 | A * | 7/1994 | Roy | G06F 17/211 345/467 |
| 5,412,771 | A * | 5/1995 | Fenwick | G06F 17/214 345/468 |
| 5,511,158 | A * | 4/1996 | Sims | G06T 17/00 345/419 |
| 6,204,861 | B1 * | 3/2001 | Chen | G06T 11/203 345/442 |

(Continued)

FOREIGN PATENT DOCUMENTS

JP        2008134827  A  *  6/2008

*Primary Examiner* — Todd Buttram
(74) *Attorney, Agent, or Firm* — Lowenstein Sandler LLP

(57) ABSTRACT

Methods and systems for rendering text to simulate human penmanship are described. A text rendering engine converts a text string into an image that can be displayed using one or more seed numbers to influence the rendering and appearance of the text. The text rendering engine may render variations of each character of the text string using the seed numbers to select from a set of single-character or multi-character glyphs, or to modify a size, weight, slope, or Bezier curve point of the character.

20 Claims, 9 Drawing Sheets

(56) References Cited

U.S. PATENT DOCUMENTS

| | | | | |
|---|---|---|---|---|
| 7,130,480 B2* | 10/2006 | Betrisey | ............... | G06T 11/203 358/1.9 |
| 7,483,570 B1* | 1/2009 | Knight | ................. | G06F 17/214 345/467 |
| 7,583,267 B2* | 9/2009 | Stamm | ................. | G06T 11/203 345/467 |
| 2001/0048436 A1* | 12/2001 | Sanger | ................. | G06F 17/214 345/467 |
| 2004/0205677 A1* | 10/2004 | Hughes | ................ | G06F 17/214 715/263 |
| 2005/0190187 A1* | 9/2005 | Salesin | ................ | G06T 11/203 345/471 |
| 2005/0229251 A1* | 10/2005 | Chellapilla | ............ | G06F 21/31 726/23 |
| 2006/0190804 A1* | 8/2006 | Yang | .................... | G06F 17/248 715/236 |
| 2010/0260420 A1* | 10/2010 | D'Agostino | ....... | G06K 9/00865 382/176 |
| 2010/0296113 A1* | 11/2010 | Fujii | .................... | G06F 3/1234 358/1.9 |
| 2011/0066965 A1* | 3/2011 | Choi | ................ | G06F 17/30014 715/776 |
| 2011/0179344 A1* | 7/2011 | Paxson | ................. | G06Q 10/00 715/205 |
| 2013/0091427 A1* | 4/2013 | Anderson | ............ | G06F 17/211 715/267 |

\* cited by examiner

Rendering 400 → | T | h | e | _ | q | u | i | ck | _ | b | r | ow | n | _ | f | o | x | _ | j | um | pe | d | _ | o | v | er | _ | th | e | _ | la | zy | _ | d | o | g | . | _ | _ | with Letter 400e labels pointing to various cells.

FIGURE 4

Rendering 500 → | Th | e | _ | qu | i | ck | _ | br | ow | n | _ | fo | x | _ | ju | mp | ed | _ | o | ve | r | _ | th | e | _ | la | zy | _ | d | og | . | _ | _ | with Letter 500e labels.

FIGURE 5

Rendering 600 → | T | he | _ | b | ro | wn | _ | f | ox | _ | ju | mp | ed | _ | ov | er | _ | th | e | _ | la | zy | _ | d | og | . | _ | _ |

FIGURE 6

Rendering 700 → | Th | e | _ | qu | i | ck | _ | br | ow | n | _ | fo | x | _ | j | um | pe | d | _ | o | ve | r | _ | th | e | _ | la | zy | _ | d | og | . | _ | _ |

FIGURE 7

Rendering 1200

Rendering 1300

SIMULATING VARIANCES IN HUMAN WRITING WITH DIGITAL TYPOGRAPHY

CROSS-REFERENCE TO RELATED APPLICATIONS

This application is a continuation of U.S. patent application Ser. No. 13/528,732, filed on Jun. 20, 2012, and hereby incorporated by reference in its entirety.

BACKGROUND OF THE INVENTION

A large and growing population of users enjoys entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like.

These electronic devices often display text to the user. It may be desirable for an electronic device to display text in new and exciting ways and, in particular, to display text that simulates the nuance and variance of human penmanship.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only. Further, it should be understood that the drawings are not necessarily proportional or to scale.

FIG. 4 illustrates a rendering of a sample text string using single-character glyphs.

FIG. 5 illustrates a rendering of the sample text string using multi-character glyphs.

FIG. 6 illustrates a rendering of the sample text string using a combination of single-character and multi-character glyphs.

FIG. 7 illustrates an alternate rendering of the sample text string using a combination of single-character and multi-character glyphs.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of embodiments of the present invention.

As noted above, electronic devices often display text to the user. In some electronic devices, text is rendered using a static font such that every instance of a particular letter in a passage appears substantially the same. However, in some cases, it may be desirable for an electronic device to render text such that different instances of a letter in a passage appear at least slightly different. For example, using such a rendering, the electronic device may be able to better simulate the natural variance in human penmanship. Thus, a correspondence, although received by a device as a text string or even entered by the drafter via a keyboard, can be rendered as though it were a handwritten letter. Similarly, the author of a book may draft a forward that can be rendered in a manner similar to the author's pen. A user, when reading an electronic book, may make annotations or notes about the material the user is reading. Those annotations may be rendered in a variable font mimicking the user's handwriting. Further, when multiple users make annotations or notes, each user's notes may be rendered in a unique font associated with that user.

Although variable text rendering may be used to simulate human penmanship, it may also be used in other ways. For example, variable text rendering may be used to simulate the natural variance of ink deposition by a moveable-type printing press, a typewriter, or a dot matrix printer. In general, variable text rendering may be used to provide a more organic or artistic aesthetic to rendered text. As another example, variable text rendering may be used to artificially slow a user's reading so as to increase the user's comprehension of the material.

Figure 1:
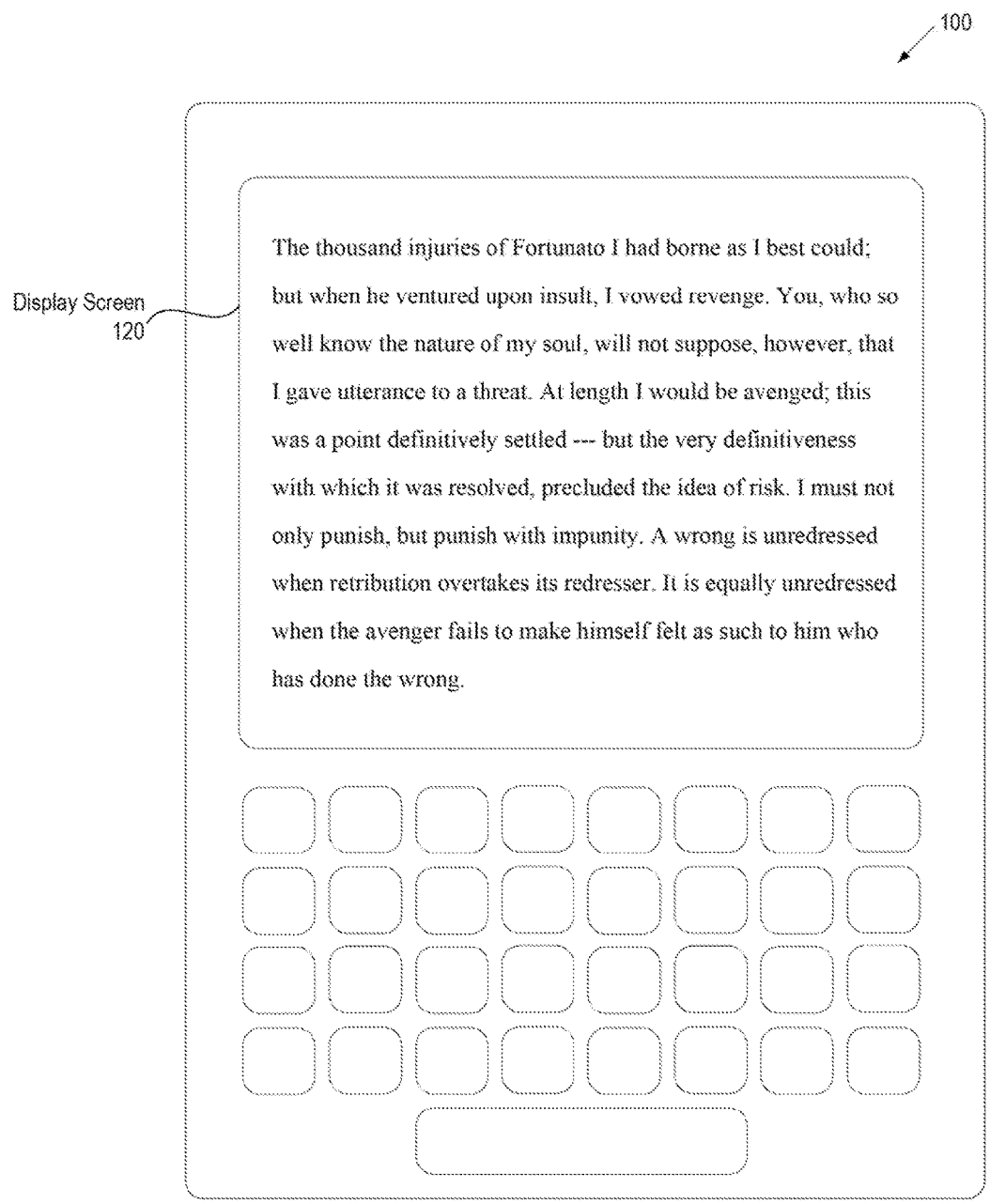
FIG. 1 illustrates an embodiment of an electronic device displaying text.

FIG. 1 illustrates an embodiment of an electronic device 100 displaying text. The electronic device 100 may include an electronic book reader, a cellular telephone, a personal digital assistant (PDAs), a portable media player, a tablet computer, a netbook, or any portable, compact electronic device.

The electronic device 100 includes a display screen 120 which can display text, images, or other media. In particular, the display screen 120 may comprise a liquid crystal display (LCD), an electrophoretic ink (E ink) screen, an interferometric modulator (IMod) screen, or any another type of display. The display screen 120 may include a plurality of pixels arranged in a grid having parameters that are individually configurable by the electronic device. For example, the electronic device 100 may be configured to configure the color and/or brightness of individual pixels so as to display an image, text, or other media.

The electronic device 100 may include a text rendering engine configured to, in a processes referred to as rendering, convert an ordered sequence of characters (or numbers corresponding to characters according to a standard, such as ASCII [American Standard Code for Information Interchange] or Unicode), referred to as a text string, into an image that can be displayed on the display screen 120. The text string may be a part of an electronic book file or embedded an in HTML [Hypertext Markup Language] document.

The text rendering engine renders the text string into an image to be displayed on the display screen 120 using one or more fonts. Each font includes, for each of a plurality of glyphs, one or more parameters that generally define the shape of the glyph. The plurality of glyphs may include glyphs that correspond to a single character. A character may be a letter, such as "a", "b", "c", "π", "ж", or "ϡ". The character may be a ligature corresponding to more than one letter, such as "æ" or "ﬃ". The character may be a symbol, such as "$", "#", or "¶". The plurality of glyphs, as will be described further below with respect to FIGS. 5-7, may include glyphs that correspond to two or more characters. The text rendering engine renders the text string using the characters of the text string, the shapes of glyphs corresponding to those characters as defined by the font, and other input parameters such as font size, font weight, font slope, kerning, line justification, line spacing, or other parameters. The text rendering engine may generate a series of modified glyphs based on the base glyphs of the font and various input parameters and then render the modified glyph into an image that can be displayed on the display screen 120.

Although many of the embodiments described below are discussed and illustrated with respect to the Roman alphabet, it is to be appreciated that other character sets may be used, including but not limited to Greek, Hebrew. Cyrillic, Arabic, and Asian character sets such as hiragana, katakana, and kanji.

In one embodiment, a font may be a raster font in which the shape of each glyph is defined by an image. The image may be defined as a matrix, or bitmap, of pixel values. In another embodiment, a font may be a vector font in which the shape of each glyph is defined by one or more lines or curves. In one embodiment, to render one or more curves, the text rendering engine splits the curves up recursively up to a point where the curve is flat enough to be drawn as a series of linear or circular segments and to avoid non-monotonic local changes in curvature. Because the glyph shapes are defined as curves, the glyphs can be scaled up or down in size by the text rendering engine while maintaining smoothness of the glyphs. It is to be appreciated that, as used herein, the term "line" and the term "curve" both includes straight lines and straight line segments as well as lines and segments with non-zero curvature. The curves may be defined as a mathematical formula or parameters to be rendered using a predetermined formula. For example, the curves may be defined by a Bezier curve or Bezier curve points to be used in rendering a Bezier curve.

Figure 2:
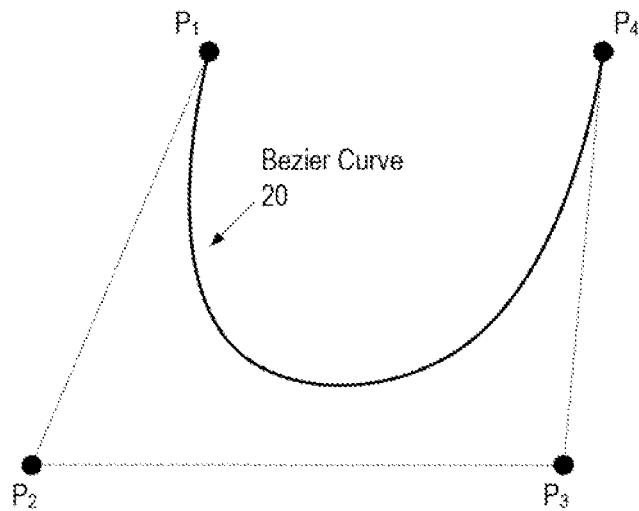
FIG. 2 illustrates a Bezier curve.

FIG. 2 illustrates a Bezier curve 20. A Bezier curve is a curve defined by two or more control points, also referred to herein as Bezier curve points. A Bezier curve may be a linear Bezier curve defined by two control points, in which case the Bezier curve is a straight line between the two control points. A Bezier curve may be a quadratic Bezier curve defined by three control points. A quadratic Bezier curve is defined by the formula:

$$B(t)=(1-t)^2P_1+2(1-t)tP_2+t^2P_3, \text{ for } 0 \le t \le 1,$$

where $B(t)$ is the Bezier curve and $P_1$, $P_2$, and $P_3$ are the control points.

A Bezier curve may be a cubic Bezier curve, such as the Bezier curve 20 illustrated in FIG. 2, defined by four control points. A cubic Bezier curve is defined by the formula:

$$B(t)=(1-t)^3P_1+3(1-t)^2tP_2+3(1-t)t^2P_3+t^3P_4, \text{ for } 0 \le t \le 1,$$

where $B(t)$ is the Bezier curve and $P_1$, $P_2$, $P_3$, $P_4$ are the control points.

Figure 3:
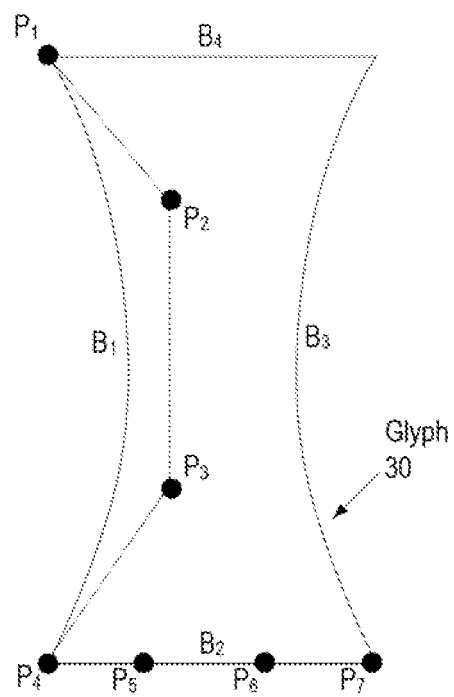
FIG. 3 illustrates a glyph representing the letter "I" composed of a plurality of Bezier curves.

FIG. 3 illustrates a glyph 30 representing the letter "I" composed of a plurality of Bezier curves. The plurality of Bezier curves generally defines a shape corresponding to the letter "I". The plurality of Bezier curves include a first, cubic Bezier curve $B_1$ defined by the control points $P_1$, $P_2$, $P_3$, and $P_4$. The plurality of Bezier curves also includes a second, cubic Bezier curve $B_2$ defined by the collinear control points $P_4$, $P_5$, $P_6$, and $P_7$. Alternatively, $B_2$ may be defined as a linear Bezier curve defined by the control points $P_4$ and $P_7$. The plurality of Bezier curves further includes Bezier curves $B_3$ and $B_4$. It is to be appreciated that more complicated character shapes, such as "T", "B", or "ξ" may also be composed of a greater number of Bezier curves.

FIG. 4 illustrates a rendering 400 of a sample text string using single-character glyphs. As mentioned above, the text rendering engine renders the text string into an image to be displayed on the display screen 120 using one or more fonts that, for each of a plurality of glyphs, contain one or more parameters that generally define the shape of the glyph. FIG. 4 illustrates the results of rendering a sample text string using a font in which each glyph corresponds to a single character. For ease of understanding, each glyph is surrounded by a box, each glyph is the same width, and the space character, " ", has been rendered as an underscore. It is to be appreciated that the text rendering engine may not include these boxes, that glyphs may be of different widths, and the space character may be invisible.

To render the first character of the sample text string, the character "T", the text rendering engine reads the glyph shape information from the font corresponding to the character "T" and generates a first portion of an image based on that glyph shape information. Similarly, to render the second character of the sample text string, the character "h", the text rendering engine reads the glyph shape information from the font corresponding to the character "h" and generates a second portion of the image based on that glyph shape information. The text rendering engine progresses in a similar manner through each of the characters, eventually generating a complete image of the sample text string.

In the rendering 400 of FIG. 4, it is to be appreciated that each instance of the letter "e", labeled with the reference number 400e, will be rendered by the text rendering engine using the same glyph shape information from the font, i.e., the glyph shape information corresponding to the character "e". Thus, each instance of the letter "e" will appear substantially similar.

FIG. 5 illustrates a rendering 500 of the sample text string using multi-character glyphs. A font may contain parameters that generally define the shape of glyphs that correspond to two or more characters. Thus, to render the first two characters of the sample text string, the characters "T" and "h", the text rendering engine reads the glyph shape information from the font corresponding to the diagraph "Th" and generates a first portion of an image based on that glyph shape information. Similarly, to render the second two characters of the sample text string, the character "e" and the space character, the text rendering engine reads the glyph shape information from the font corresponding to the digraph "e_" and generates a second portion of the image based on that glyph shape information. The text rendering engine progresses in a similar manner through each of the characters, eventually generating a complete image of the sample text string.

Unlike the example rendering 400 of FIG. 4, it is to be appreciated that each instance of the letter "e" in the example rendering 500 of FIG. 5, labeled with the reference number 500e, will not be rendered by the text rendering engine using the same glyph shape information from the font. In particular, the first instance of the letter "e" will be rendered using the glyph shape information from the font corresponding to the digraph "e_" and the second instance of the letter "e" will be rendered using the glyph shape information from the font corresponding to the digraph "ed". An appropriately designed font may define the digraphs "e_" and "ed" to have substantially different shaped versions of the letter "e". For example, the "e" in the digraph "e_" may have an elongated terminal, whereas the "e" in the digraph "ed" may have a terminal that extends into the counter of the letter "d".

FIG. 6 illustrates a rendering 600 of the sample text string using a combination of single-character and multi-character glyphs. A font may contain parameters for two sets of glyphs, a first set of glyph parameters that generally define the shape of glyphs that correspond to one character, and a second set of glyph parameters that generally defines the shape of glyphs that correspond to two or more characters. Upon receiving a text string, the text rendering engine may make choices, randomly or based on a predetermined rule set, as to how to use these two sets of glyph parameters to render the text string.

For example, upon receiving the sample text string, the text rendering engine may randomly chose to render the first character using a single-character glyph. Thus, the text rendering engine reads the glyph shape information from the font corresponding to the single character "T" and generates a first portion of an image based on that glyph shape information. Next, the text rendering engine randomly chooses to render the second character using a multi-character glyph. Thus, the text rendering engine reads the glyph shape information from the font corresponding to the digraph "he" and generates a second portion of the image based on that glyph shape information. Continuing, the text rendering engine randomly chooses to render the next unrendered character using a single-character glyph. Thus, the text rendering engine read the glyph shape information from the font corresponding to the space character and generates a next portion of the image based on that glyph shape information. The frequency that the text rendering engine randomly chooses to render a character using a single-character glyph or a multi-character glyph, may be configured as an input parameter of the text rendering engine.

As noted above, the text rendering engine may make the choices using a predefined rule set. For example, the rule set may specify that all uppercase letters are to be rendered using single-character glyphs or that the space character shall always be rendered singly. The rule set may specify that certain character combinations are to be rendered together, such as "ij" or "ll". The rule set may specify, through predetermined seed values, exactly which characters are be rendered using single-character glyphs and which characters are to be rendered using multi-character glyphs. For example, the seed values may indicate that the first, fourth, fifth, seventh, and tenth characters are to be rendered singly. The predetermined seed values may be stored, for example, in a header of an electronic book file containing the text string to be rendered.

The electronic book may be, for example, an EPUB file, a MOBI file, a PRC file, or an KF8 [Kindle Format 8] file. In general, the electronic book may store the text string in an encapsulated XML [Extensible Markup Language] file. In one embodiment, the electronic book may be an HTML [Hypertext Markup Language] file.

FIG. 7 illustrates an alternate rendering 700 of the sample text string using a combination of single-character and multi-character glyphs. As noted above, the text rendering engine may make random choices as to how to use single-character glyphs and multi-character glyphs to render the text string. Thus, even the same sample text string may be rendered differently in different renderings.

Whereas a font containing glyphs corresponding to the uppercase and lowercase letters of the Roman alphabet and a core set of symbols may contain approximately 64 glyphs, a font containing glyphs corresponding to all possible digraphs of these letters and symbols may contain approximately 4096 (64×64) glyphs. This increase in the size of the font can be mitigated by selecting a subset of the possible digraphs to include in the font. For example, the digraph "it" is far more common in English than the digraph "qr". Thus, the font may include only the most commonly used digraphs. In one embodiment, the font may be bundled with the text string as a single file. By analyzing the text string, the most common digraphs may be determined and only those most common digraphs included in the font with a complete set of single-character glyphs. The diagraphs may be stored, for example, in the private use area (pua) of the font.

As discussed above, the text rendering engine may use digraphs and/or random choices to add variation to the rendering of letters and text strings. For example, as illustrated in FIG. 5, the letter "e" is rendered three different ways using glyph shape information from three different digraphs, "e_", "ed" and "ve". As illustrated by the rendering 600 of FIG. 6 and the alternate rendering 700 of FIG. 7, even the same text string may be rendered differently in different renderings based on random choices. FIGS. 8-11 illustrate additional ways to add variation to the rendering of text. For ease of understanding, each rendering is surrounded by a box.

Figure 8:
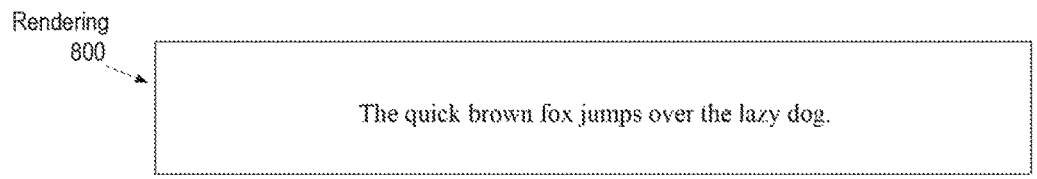
FIG. 8 illustrates a rendering of the sample text string without variation.

FIG. 8 illustrates a rendering 800 of the sample text string without variation. In one embodiment, the rendering 800 illustrated by FIG. 8 is performed by the text rendering engine using the characters of the text string, the shapes of glyphs corresponding to those characters as defined by a font, and a set of unchanging input parameters, such as font size, font weight, and font slope. In particular, the input parameters are the same for each rendered character. In some embodiments, how the input parameters affect the rendering is determined solely by the text rendering engine. In other embodiments, however, how the input parameters affect the rendering is determined by information embedded in the font, as interpreted by the text rendering engine.

Figure 9:
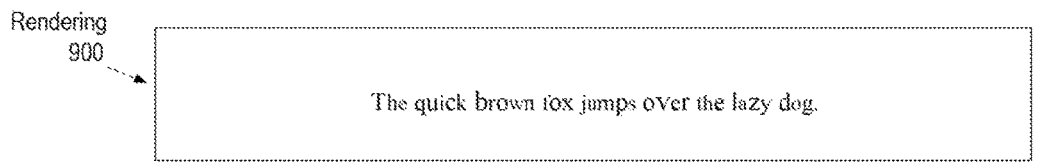
FIG. 9 illustrates a rendering of the sample text string with glyph-specific font size variation.

FIG. 9 illustrates a rendering 900 of the sample text string with glyph-specific font size variation. In one embodiment, the rendering 900 illustrated by FIG. 9 is performed by the text rendering engine using the characters of the text string, the shapes of glyphs corresponding to those character of the text string, and a set of font sizes. In the rendering 900 of FIG. 9, other input parameters, such as font weight and font slope are kept constant. In particular, whereas the rendering 800 of FIG. 8 was performed using the Times New Roman font with a font size of 12pt for each glyph, the rendering 900 of FIG. 9 was performed using the Times New Roman font with a font size selected for each glyph as either 10pt, 11pt, 12pt, or 13pt. In one embodiment, the font size for each glyph is determined based on a set of predetermined seed values. In another embodiment, the font size for each glyph is determined based on a set of random numbers. Although the term "random" is used herein, it is to be appreciated that the random numbers may be pseudorandom numbers or "true" random numbers. The random numbers may be generated by a random number generator according to a variety of physical and computational methods. In one embodiment, the random numbers are generated by generating a set of uniformly distributed random numbers using a random number generator and by transforming the set of uniformly distributed random numbers to generate the set of random numbers.

The text rendering engine may use the set of random numbers to select random font sizes for each glyph in a number of different ways. For example, the random numbers may be used to select, for each glyph, a font size from a discrete set of font sizes. As another example, the random numbers may be used to set, for each glyph, a font size from within a continuous interval. As another example, the random numbers may be used to add, for each glyph, Gaussian noise to a predetermined font size. Relatedly, the text rendering engine may take, as input parameters, randomization parameters that determine how the random numbers are generated or how those random numbers are used to determine a font size for each glyph. For example, the text rendering engine may take, as input parameters, a mean font size and a font size variance.

Figure 10:
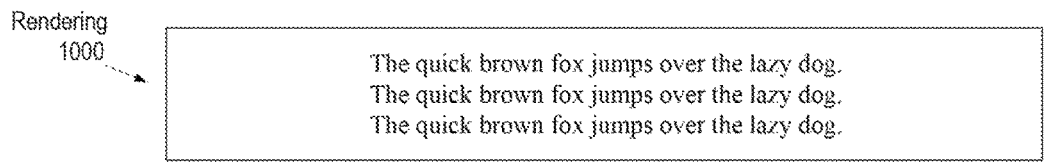
FIG. 10 illustrates a rendering of multiple iterations of the sample text string without variation.
Figure 11:
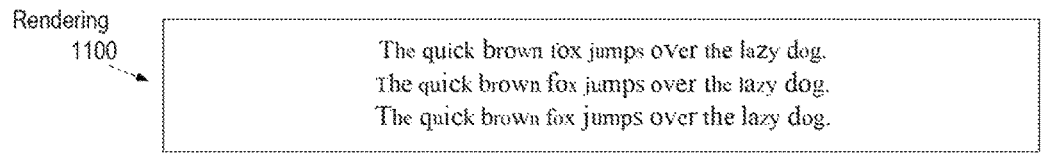
FIG. 11 illustrates a rendering of multiple iterations of the sample text string with glyph-specific font size variation.

By adding variation to the font size, variation is added to the rendering of the sample text and to the letters thereof. In particular, it can be seen that the various instances of the letter "e" appear slightly different as they are of slightly different sizes. Although the rendering 900 of FIG. 9 may appear somewhat unnatural, the use of Times New Roman illustrates an extreme example of the possible effect of variable font size. FIG. 10 and FIG. 11 illustrate a less extreme example illustrating the ability of variable font size to heighten the simulation of natural penmanship.

FIG. 10 illustrates a rendering 1000 of multiple iterations of the sample text string without variation. In particular, the rendering 1000 of FIG. 10 was performed using the CCH Handwriting font with a font size of 12pt. FIG. 11 illustrates a rendering 1100 of multiple iterations of the sample text string with glyph-specific font size variation. In particular, the rendering 1100 of FIG. 11 was performed using the CCH Handwriting font with a font size selected for each glyph as either 10pt, 11pt, 12pt, or 13pt. Whereas the first iteration of the sample text string illustrated by the rendering 1000 of FIG. 10 may appear somewhat natural, alone, the multiple iterations emphasize the formulaic appearance of the limited static rendering. However, by introducing font size variation as illustrated by the rendering 1100 of FIG. 11, each iteration of the sample text differs slightly just as human writing would. Thus, the rendering 1100 of FIG. 11 looks more natural than the rendering 1000 of FIG. 10.

Figure 12:
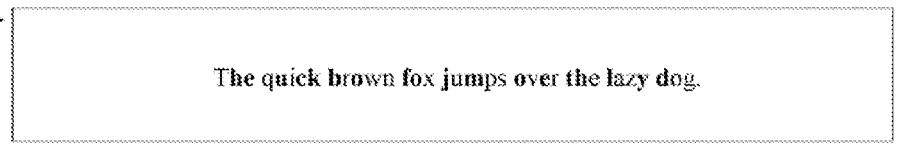
FIG. 12 illustrates a rendering of the sample text string with glyph-specific font weight variation.

FIG. 12 illustrates a rendering 1200 of the sample text string with glyph-specific font weight variation. The font weight of a particular font is the thickness of the character outlines relative to their height. Font weight can vary from ultra-light to extra-bold or black. In one embodiment, the text rendering engine is configured to render a glyph using one of two font weights: "default" and "bold". In another embodiment, the text rendering engine is configured to render a glyph using a font weight selected from more than two choices. In a particular embodiment, the text rendering engine is configured to render a glyph using a font weight from between 100 to 900.

In one embodiment, the rendering 1200 of FIG. 12 is performed by the text rendering engine using the characters of the text string, the shapes of glyphs corresponding to those character of the text string, and a set of font weights. In the rendering 1200 of FIG. 12, other input parameters, such as font size and font slope are kept constant. In particular, whereas the rendering 800 of FIG. 8 was performed using the Times New Roman font with a font size of 12pt and a "default" font weight, the rendering 1200 of FIG. 12 was performed using the Times New Roman font with a font size of 12pt and a font weight selected for each glyph as either "default" or "bold". In one embodiment, the font weight for each glyph is determined based on a set of predetermined seed values. In another embodiment, the font weight for each glyph is determined based on a set of random numbers.

The text rendering engine may use the set of random numbers to select a random font weight for each glyph in a number of different ways. For example, the random numbers may be used to select, for each glyph, a font weight from a discrete set of font weights, such as "default" and "bold". As another example, the random numbers may be used to set, for each glyph, a font weight from within a continuous interval. As another example, the random numbers may be used to add, for each glyph, Gaussian noise to a predetermined font weight. Relatedly, the text rendering engine may take, as input parameters, randomization parameters that determine how the random numbers are generated or how those random numbers are used to determine a font weight for each glyph. For example, the text rendering engine may take, as input parameters, a mean font weight and a font weight variance.

Figure 13:
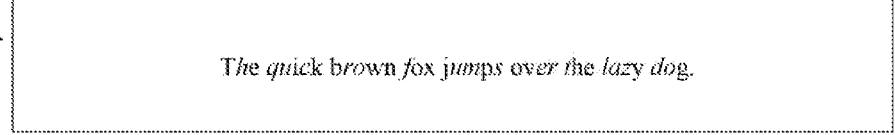
FIG. 13 illustrates a rendering of the sample text string with glyph-specific font slope variation.

FIG. 13 illustrates a rendering 1300 of the sample text string with glyph-specific font slope variation. The font slope of a particular font is generally related to the angle of a glyph axis to a text axis, the direction which the text flows (e.g., in English, left-to-right). Font slope can vary from 0 degrees from perpendicular to approximately 45 degrees from perpendicular. In one embodiment, the text rendering engine is configured to render a glyph using one of two font slopes: "default" and "italic". In another embodiment, the text rendering engine is configured to render a glyph using a font slope selected from more than two choices.

In one embodiment, the rendering 1300 of FIG. 13 is performed by the text rendering engine using the characters of the text string, the shapes of glyphs corresponding to those character of the text string, and a set of font slopes. In the rendering 1300 of FIG. 13, other input parameters, such as font size and font weight are kept constant. In particular, whereas the rendering 800 of FIG. 8 was performed using the Times New Roman font with a font size of 12pt and a "default" font slope, the rendering 1300 of FIG. 13 was performed using the Times New Roman font with a font size of 12pt and a font weight selected for each glyph as either "default" or "italic". In one embodiment, the font slope for each glyph is determined based on a set of predetermined seed values. In another embodiment, the font slope for each glyph is determined based on a set of random numbers.

The text rendering engine may use the set of random numbers to select a random font slope for each glyph in a number of different ways. For example, the random numbers may be used to select, for each glyph, a font slope from a discrete set of font slopes, such as "default" and "italic". As another example, the random numbers may be used to set, for each glyph, a font slope from within a continuous interval. As another example, the random numbers may be used to add, for each glyph, Gaussian noise to a predetermined font slope. Relatedly, the text rendering engine may take, as input parameters, randomization parameters that determine how the random numbers are generated or how those random numbers are used to determine a font slope for each glyph. For example, the text rendering engine may take, as input parameters, a mean font slope and a font slope variance.

Many other parameters can be varied on the glyph level, randomly or based on predetermined seed values. For example, character spacing, width, serif size, ascender size and or descender size can also be varied for each glyph or for randomly selected glyphs. Additionally, although the figures above only show variation of one parameter for each rendering, the text rendering engine may vary more than one parameter at a time.

As discussed above, the text rendering engine can use predetermined seed values or random numbers to determine how to render a text string using predefined input parameters that affect the general shape of glyphs. In another embodiment, the text rendering engine can use predetermined seed values or random numbers to more directly affect the shape of glyphs by affecting the Bezier curves (or Bezier curve points) defining each glyph.

Figure 14:
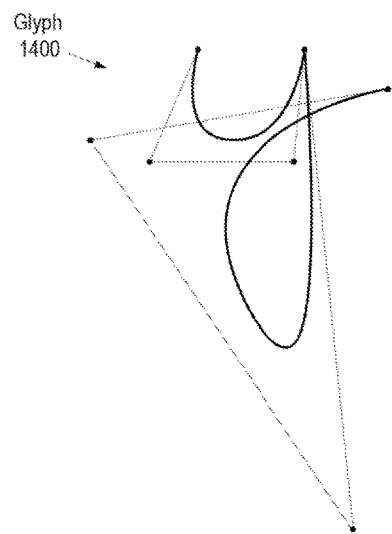
FIG. 14 illustrates a glyph representing the letter "y" composed of two of Bezier curves.

FIG. 14 illustrates a glyph 1400 representing the letter "y" composed of two of Bezier curves. The two curves are each defined by four control points. By changing the location of the control points or changing the coordinates representing the location of control points, the appearance of the glyph 1400 is similarly changed. For example, in one embodiment, the text rendering engine may render each character of text string by reading, for each character, glyph shape information from a font corresponding to the character and comprising a plurality of sets of Bezier curve points, modifying the Bezier curve points randomly or using predetermined seed values, and rendering Bezier curves based on the modified Bezier curve points. The modified Bezier curve points may be generated, for example, by adding Gaussian noise to the Bezier curve point location coordinates. The modified Bezier curve points may be generated, as another example, by randomly scaling the Bezier curve point location coordinates.

Figure 15:
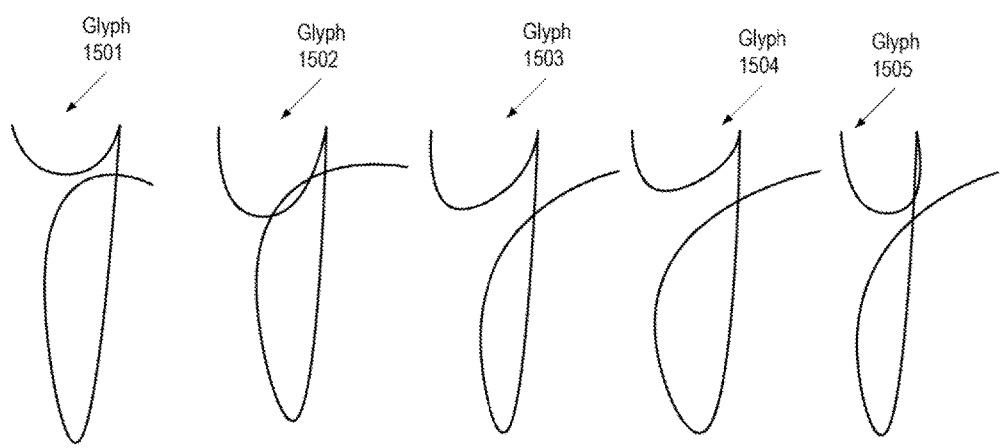
FIG. 15 illustrates a plurality of glyphs, each representing the letter "y", composed of two Bezier curves.

FIG. 15 illustrates a plurality of glyphs 1501-1505, each representing the letter "y" and each composed of two Bezier curves. Each of the plurality of glyphs 1501-1505 includes Bezier curves with slightly different control points.

Whereas a static font may be defined as a set of glyphs, each glyph including a plurality of sets of Bezier curve points, each time a particular glyph is rendered using the static font, it will appear substantially the same. In another embodiment, a variable font may be defined as a set of glyphs, each glyph including a plurality of sets of Bezier curve point probability distribution functions. Thus, each time a particular glyph is rendered using the variable font, a new sample set of Bezier curve points is generated based on the probability distribution functions and the glyph is rendered by that sample set, appearing different each time. The Bezier curve point probability distribution functions may, for each Bezier curve point, define a mean and a variance. The Bezier curve point probability distribution functions may be independent for each Bezier curve point, or may be a multivariable probability distribution function of multiple Bezier curve points. The Bezier curve points for different Bezier curves of the glyph may also be either independent or dependent. Further, a single random value may be used to vary more than one Bezier curve. For example, a single random value may be used to vary two opposing Bezier curves to vary a width of a glyph while maintaining symmetry.

Figure 16:
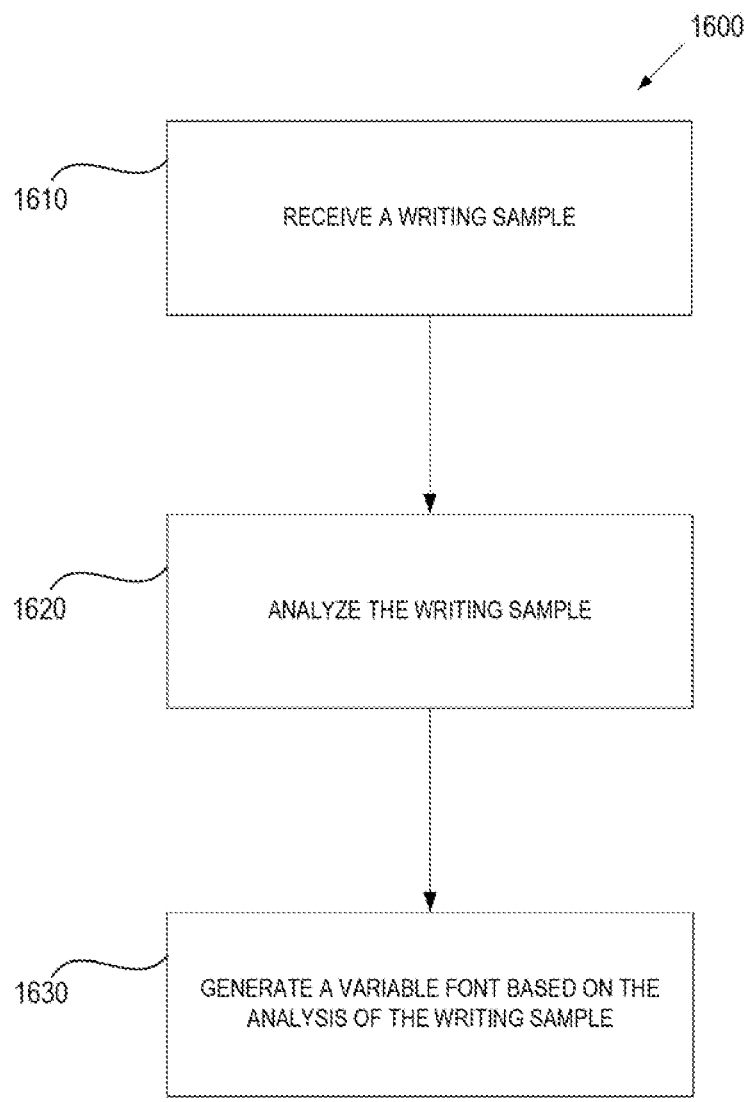
FIG. 16 illustrates a flowchart of a method of generating a variable font.

FIG. 16 illustrates a flowchart of a method 1600 of generating a variable font. The method 1600 begins in block 1610 with the reception of a writing sample. The writing sample may be one or more pages of text writing by a person's hand. For example, the writing sample may be historical documents by an author. As another example, the writing sample may be drafted specifically for the purpose of generating a variable font. For example, a person may be requested to write each letter in the alphabet a number of times in a matrix. The matrix may be, for example, 52 by 20, with each of the 26 letters of the alphabet both uppercase and lowercase written 20 times. The writing sample may be received as, or converting into, one or more image files for analysis by a computer.

In block 1620, the writing sample is analyzed. As mentioned above, in one embodiment, the writing sample may be (images of) one or more historical documents by an author. In such a case, analyzing the writing sample includes segmenting the writing sample into a plurality of glyph images, each glyph associated with a different character. Preferably, the writing sample includes, for each character, a plurality of glyph images. However, in some cases, the writing sample may include only one glyph image for certain lesser-used characters or may completely lack glyph images for rarely-used characters. If the writing sample is drafted specifically for the purpose of generating a variable font, segmenting the writing sample may be simplified.

In block 1630, the analysis is used to generate a variable font. In particular, the variable font includes Bezier curve probability distribution functions determined based on the plurality of glyph images.

Figure 17:
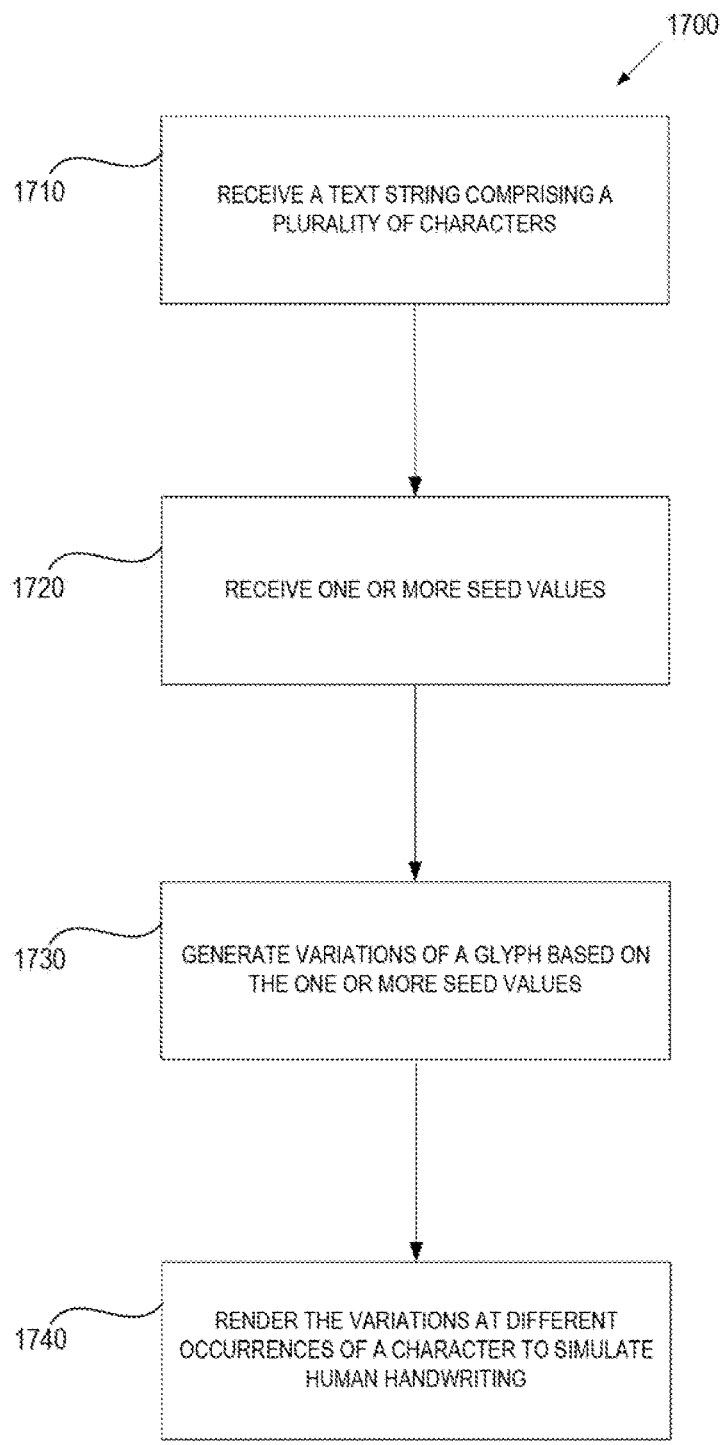
FIG. 17 illustrates a flowchart of a method of rendering text.

FIG. 17 illustrates a method 1700 of rendering text. The method 1700 begins, in block 1710, with the reception of a text string comprising a plurality of characters. The text string may be, for example, a sequence of numbers representing characters according to a standard, such as ASCII or Unicode. The text string may be a part of an electronic book or embedded an in HTML [Hypertext Markup Language] document.

In block 1720, one or more seed values are received. The seed values may be a plurality of predetermined seed values or may be randomly generated. In one embodiment, the seed values are stored in a header of an electronic book file containing the text string. Although the term "random" is used herein, it is to be appreciated that the random numbers may be pseudorandom numbers or "true" random numbers. The random numbers may be generated by a random number generator according to a variety of physical and computational methods. In one embodiment, the random numbers are generated by generating a set of uniformly distributed random numbers using a random number generator and by transforming the set of uniformly distributed random numbers to generate the set of random numbers. The one or more random numbers may have a uniform distribution, a Gaussian distribution, or any other continuation distribution. Similarly, the one or more random numbers may have any discrete distribution, such as but not limited to a Bernoulli distribution.

In block 1730, variations of a glyph are generated based on the one or more seed values. In one embodiment, each character of the text string is used with one or more of the seed numbers to generate a variation of a corresponding glyph. In another embodiment, only one seed number is used to generate a plurality of glyphs based on a plurality of characters.

In one embodiment, as illustrated in FIG. 6 and FIG. 7, the seed values are used to choose between rendering characters using single-character glyphs and multi-character glyphs. In another embodiment, the alternate sequences of glyphs represented by FIG. 6 and FIG. 7 may be developed according to two rule sets and a single seed value used to select between the two alternate sequences.

In another embodiment, as illustrated in FIG. 9, the seed values are used to determine a font size for each character. In another embodiment, as illustrated in FIG. 12 and FIG. 13, the seed values are used to determine a font weight and/or a font slope for each character. In another embodiment, as illustrated in FIG. 15, the seed values are used to determine one or more Bezier curve parameters for each character.

As noted above, a font may define, for each of a plurality of characters, an image or a curve set. The variations of the glyph can be generated by a text rendering engine that reads, from a font, an image or a curve set associated with a character corresponding to the glyph and then alters the image or curve set based on the seed values. In another embodiment, a font may define, for each of a plurality of characters, a "glyph procedure" or subroutine that defines the shape of a glyph. Thus, the variations of the glyph can be generated at the font level. The variations of the glyph generated at the font level can be rendered using a standard text rendering engine that is not configured to introduce variation. Nevertheless, because the variation is introduced at the font level, the end result displayed to a user will include variations of the glyph.

A font may include, for each of a plurality of characters, a subroutine that defines the shape of a glyph. The subroutine may include a number of operations that define the shape of the glyph including path definition operations, hint definition operations, arithmetic operations, conditional operations, and storage operations. Other operations may be included in the subroutine. In one embodiment, the subroutine includes at least one random operation that generates one or more random seed values. Thus, although the subroutine defining the shape of the glyph is unchanging, specific calls of the subroutine will return different glyph instances to a text rendering engine.

In block 1740, the variations of the glyph are rendered at different occurrences of a character in a text string to simulate human handwriting of the text string. As noted above, variations of a glyph are generated based on the one or more seed values. For example, variations of a glyph corresponding to the character "y" may be generated, such as the variations illustrated in FIG. 15. The multiple variations may be used at different occurrences of the character "y" in the text string to simulate human handwriting. Variations of different glyphs may be generated and rendered at occurrences of corresponding characters. In one embodiment, rendering the variations comprising displaying the result. In one embodiment, the variations of the glyph are displayed on a display screen of an electronic device as described with respect to FIG. 1 above and more fully detailed with respect to FIG. 18 below. In one embodiment, displaying the variations of the glyph includes rendering the variations into an image that can be displayed on a display screen and displaying that image on the display screen. The display screen may be, for example, an E Ink display.

Figure 18:
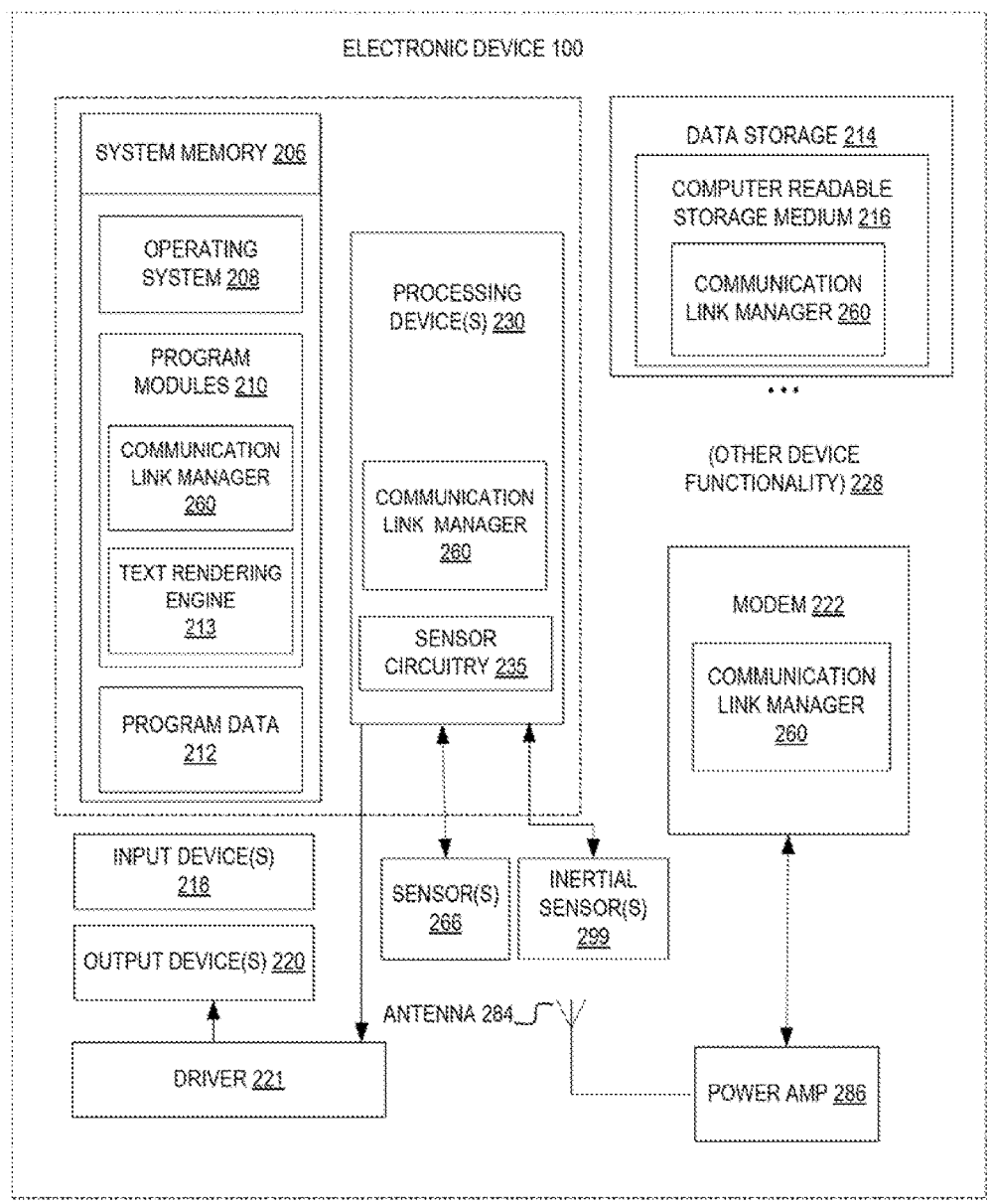
FIG. 18 illustrates an exemplary electronic device capable of rendering text on a display screen.

FIG. 18 illustrates an exemplary electronic device 100 capable of rendering text on a display screen. The electronic device 200 may correspond to the electronic device 100 of FIG. 1 and may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 200 includes one or more processing devices 230, such as one or more central processing units (CPUs), microcontrollers, field programmable gate arrays, or other types of processing devices. The electronic device 200 also includes system memory 206, which may correspond to any combination of volatile and/or non-volatile storage mechanisms. The system memory 206 may include one or more of read-only memory (ROM), flash memory, dynamic random access memory (DRAM) such as synchronous DRAM (SDRAM)), and static random access memory (SRAM)). The system memory 206 stores information which provides an operating system component 208, various program modules 210 such as communication link manager 260, program data 212, and/or other components. The electronic device 200 performs functions by using the processing device(s) 230 to execute instructions provided by the system memory 206.

The electronic device 200 also includes a data storage device 214 that may be composed of one or more types of removable storage and/or one or more types of non-removable storage. The data storage device 214 includes a computer-readable storage medium 216 on which is stored one or more sets of instructions embodying any one or more of the methodologies or functions described herein. As shown, instructions for the communication link manager 260 may reside, completely or at least partially, within the computer readable storage medium 216, system memory 206 and/or within the processing device(s) 230 during execution thereof by the electronic device 200, the system memory 206 and the processing device(s) 230 also constituting computer-readable media. The electronic device 200 may also include one or more input devices 218 (keyboard, mouse device, specialized selection keys, etc.) and one or more output devices 220 (displays, printers, audio output mechanisms, etc.). In one embodiment, the input devices 218 and the output devices 220 may be combined into a single device (e.g., a touch screen).

The electronic device 200 further includes a wireless modem 222 to allow the electronic device 200 to wirelessly communicate with other computing devices. The wireless modem 222 allows the electronic device 200 to handle both voice and non-voice communications (such as communications for text messages, multimedia messages, media downloads, web browsing, etc.). The wireless modem 222 may also allow the electronic device 200 to handle other signaling data to facilitate communication of the voice and non-voice data between the electronic device 200 and other devices. The wireless modem 222 may provide network connectivity using any type of mobile network technology including, for example, cellular digital packet data (CDPD), general packet radio service (GPRS), enhanced data rates for global evolution (EDGE), universal mobile telecommunications system (UMTS), 1 times radio transmission technology (1×RTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. In one embodiment, the wireless modem includes the communication link manager 260 in addition to, or instead of, the communication link manager 260 being included in the computer readable storage medium 216, system memory 206 and/or processing device(s) 230. The communication link manager 222 may be implemented as hardware, firmware and/or software of the wireless modem 222. It should be noted that the modem 222 may include a processing component that performs various operations to handle both voice and non-voice communications. This processing component can execute the communication link manager 260. Alternatively, the communication link manager 260 can be executed by a processing component of the electronic device, such as the processing device 230.

The wireless modem 222 may generate signals and send these signals to power amplifier (amp) 280 for amplification, after which they are wirelessly transmitted via antenna 284. The antenna 284 may be directional, omni-directional or non-directional antennas. In addition to sending data, the antenna 284 can be deployed to receive data, which is sent to wireless modem 222 and transferred to processing device(s) 230. In one embodiment, the antenna 284 may be used to form communication links between the electronic device 200 and a base station (e.g., a NodeB or a cell tower).

The processing device(s) 230 and the modem 222 may be a general-purpose processing devices such as a microprocessor, central processing unit, or the like. More particularly, the processing device(s) 230 and the modem 222 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device(s) 230 and the modem 222 may also be one or more special-purpose processing devices such as an application specific integrated circuit (ASIC), a field programmable gate array (FPGA), a digital signal processor (DSP), network processor, or the like.

In one embodiment, electronic device 200 includes one or more sensors 266 such as a physical contact sensor or close proximity sensors. The sensors 266 can detect the human body parts proximate to the electronic device, and convey information regarding the detection to processing device(s) 230. In one embodiment, the sensors 266 may be capacitive sensors that are configured to measure capacitance generated by the human body part proximate to the electronic device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 266 may also be optical (e.g., infrared) sensors that use an emitter and receiver pair to detect the presence of opaque objects. Alternatively, the sensors 266 may be inductive sensors, which include an inductive loop. When the presence of a human body part (or metal object) is brought close to the inductive sensor, an induction of the inductive loop changes, causing the human body part to be detected. Alternatively, the sensors 266 may be ultrasonic sensors that emit an ultrasonic signal and measure a time duration between when a signal is transmitted and the reflection of that signal received (a.k.a., flight response). The sensors 266 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 266 may be used to determine a distance between one or more of the antennas and the detected human body part. Though the detected object is described herein as a human body part, other types of objects may also be detected depending on the sensing technologies used.

In one embodiment, electronic device 200 includes one or more inertial sensors 299. The inertial sensors 299 can be used to detect motion of the electronic device 200. In one embodiment, the inertial sensors 299 detect linear accelerations (translational movement) and angular accelerations (rotational movement). The inertial sensors 299 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 299 in one embodiment are micro-electromechanical systems (MEMS) sensors.

In one embodiment, the motion data from the one or more inertial sensors 299 may be used to determine an orientation of the electronic device 200 to determine if a communication link criterion is satisfied (e.g., whether the electronic device 200 is in proximity to a user's body). In another embodiment, the sensor data from the one or more sensors 266 may be used to determine an orientation of the electronic device 200 for to determine if a communication link criterion is satisfied. In a further embodiment, of the motion data and the sensor data may be used to determine whether a communication link criterion is satisfied.

The processing device(s) 230 may include sensor circuitry 235 (e.g., sensor device drivers) that enables the processing device(s) 230 to interpret signals received from the sensor(s) 266 and/or inertial sensors 299. In one embodiment, the sensors 266 and/or inertial sensors 299 output fully processed signals to the processing device(s) 230. For example, the sensors 266 may output a distance, a detected/not detected signal, etc. using a single line interface or a multi-line interface. Similarly, inertial sensors 299 may output an acceleration value (e.g., in Gs). In another embodiment, the sensors 266 output, for example, positional data and/or object presence data (e.g., of a human body part) to the processing devices) 230 without first processing the data. Similarly, inertial sensors 299 may output, for example, voltage values that can be interpreted as acceleration values. In either instance, the processing device(s) 230 may use the sensor circuitry 235 to process and/or interpret the received data. If data is received from multiple sensors 266 and/or inertial sensors 299, processing the data may include averaging the data, identifying a maximum from the data, or otherwise combining the data from the multiple sensors. In one embodiment, in which the sensors 266 include a sensor array, numerous sensors, or a touch panel, processing the data includes determining where on the electronic device the human body part is located from multiple sensor readings.

The program modules 210 may further include a text rendering engine 213 configured to render text. In particular, the text rendering engine 213 may be configured to convert a text string received from the data storage 214 or the system memory 206 into an image or other data that can be provided to a driver 221 by the processing device(s) 230 to affect a change on the output device 220. The text rendering engine 213 may be configured to use a font stored in the data storage 214 or the system memory 206 to render the text string. In one embodiment, the text rendering engine 213 is configured to render the text string using one or more random numbers.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present invention should, therefore, be determined with reference to the appended claims, along with the full scope of equivalents to which such claims are entitled.

What is claimed is:

1. A method, comprising:
receiving a text string comprising a plurality of characters;
storing a plurality of single-character glyphs;
storing a plurality of multi-character glyphs;
generating a plurality of random numbers;
using a first random number of the plurality of random numbers to determine a first character of the plurality of characters to be rendered, wherein the first random number indicates that the first character is to be rendered as a first single-character glyph of the plurality of single-character glyphs;
using a second random number of the plurality of random numbers to determine a second character of the plurality of characters to be rendered, wherein the second random number indicates that the second character is to be rendered as a part of a first multi-character glyph of the plurality of multi-character glyphs; and
selecting a sequence of glyphs from the plurality of single-character glyphs and the plurality of multi-character glyphs, the sequence of glyphs comprising the first single character glyph and the first multi-character glyph.

2. The method of claim 1, wherein the plurality of multi-character glyphs comprises a plurality of digraphs, wherein each of the plurality of digraphs is associated with exactly two characters, and wherein selecting the sequence of glyphs comprises selecting a sequence of digraphs based on the plurality of characters in the text string.

3. The method of claim 1, wherein selecting the sequence of glyphs comprises selecting a sequence of single-character glyphs based on at least one random number of the plurality of random numbers.

4. The method of claim 1, wherein selecting the sequence of glyphs comprises selecting the sequence of glyphs based on one or more predetermined rules.

5. The method of claim 4, wherein the one or more predetermined rules comprise a rule specifying that one or more specific characters are to be rendered as a single-character glyph.

6. The method of claim 4, wherein the one or more predetermined rules comprise a rule specifying that a specific character combination is to be rendered as a multi-character glyph.

7. The method of claim 1, wherein selecting the sequence of glyphs comprises selecting from between at least a first sequence of glyphs and a second sequence of glyphs, wherein the first sequence of glyphs and the second sequence of glyphs both correspond to the characters of the text string.

8. A method comprising:
using a random number to determine a character to be rendered;
identifying, by a processing device, a glyph corresponding to the character;
determining, by the processing device, a variable font defining the glyph, wherein the variable font defines the glyph using one or more probability distribution functions;
generating, by the processing device, a first variation of the glyph by applying a first seed value to the one or more probability distribution functions, the first seed value comprising a first random number;
generating a second variation of the glyph by applying a second seed value to the one or more probability distribution functions, the second seed value comprising a second random number;
rendering the first variation of the glyph at a first occurrence of the character in a text string; and
rendering the second variation of the glyph at a second occurrence of the character in the text string to simulate human handwriting of the text string.

9. The method of claim 8, further comprising:
receiving an electronic book file comprising a header storing the first seed value and the second seed value and a body comprising the text string.

10. The method of claim 8, further comprising:
generating a plurality of random numbers;
generating the first seed value using a first random number of the plurality of random numbers; and
generating the second seed value using a second random number of the plurality of random numbers.

11. The method of claim 8, wherein generating the first variation of the glyph comprises:
determining a first font size based on the first seed value and the one or more probability distribution functions; and
generating the first variation of the glyph based on the first font size.

12. The method of claim 8, wherein generating the first variation of the glyph comprises:
determining a first font weight based on the first seed value and the one or more probability distribution functions; and
generating the first variation of the glyph based on the first font weight.

13. The method of claim 8, wherein generating the first variation of the glyph comprises:
determining a first font slope based on the first seed value and the one or more probability distribution functions; and
generating the first variation of the glyph based on the first font slope.

14. The method of claim 8, wherein generating the first variation of the glyph comprises:
determining a plurality of Bezier parameters based on the first seed value and the one or more probability distribution functions; and
generating the first variation of the glyph based on the plurality of Bezier parameters, wherein the first variation of the glyph is associated with one or more Bezier curves defined, at least in part, by one or more of the plurality of Bezier parameters.

15. The method of claim 14, wherein at least one of the plurality of Bezier parameters is indicative of a Bezier curve point location coordinate.

16. The method of claim 8, wherein generating the first variation of the glyph comprises executing a text rendering engine that uses the variable font to determine a base glyph shape and generates the first variation of the glyph based on the base glyph shape and the one or more probability distribution functions.

17. The method of claim 8, wherein generating the first variation of the glyph comprises executing a text rendering engine that uses the variable font to call a font subroutine that returns a glyph shape for the first variation of the glyph that is different from an original glyph shape of the glyph.

18. The method of claim 8, wherein the variable font defines the glyph as a set of Bezier curve point probability distribution functions and wherein generating the first variation of the glyph comprises generating sample sets of Bezier curve point location coordinates based on the Bezier curve point probability distribution functions.

19. A system, comprising:
a memory to store instructions; and
a processing device, operatively coupled to the memory, to execute the instructions, wherein the processing device is to:
use a random number to determine a character to be rendered;
identify a glyph corresponding to the character;
determine a variable font defining the glyph, wherein the variable font defines the glyph using one or more probability distribution functions;
generate a first variation of the glyph by applying a first seed value to the one or more probability distribution functions, the first seed value comprising a first random number;
generate a second variation of the glyph by applying a second seed value to the one or more probability distribution functions, the second seed value comprising a first random number;
render the first variation of the glyph at a first occurrence of the character in a text string; and
render the second variation of the glyph at a second occurrence of the character in the text string to simulate human handwriting of the text string.

20. The system of claim 19, wherein the processing device is further to:
generate a plurality of random numbers;
generate the first seed value using a first random number of the plurality of random numbers; and
generate the second seed value using a second random number of the plurality of random numbers.

* * * * *